UNITED STATES PATENT OFFICE 2,519,124

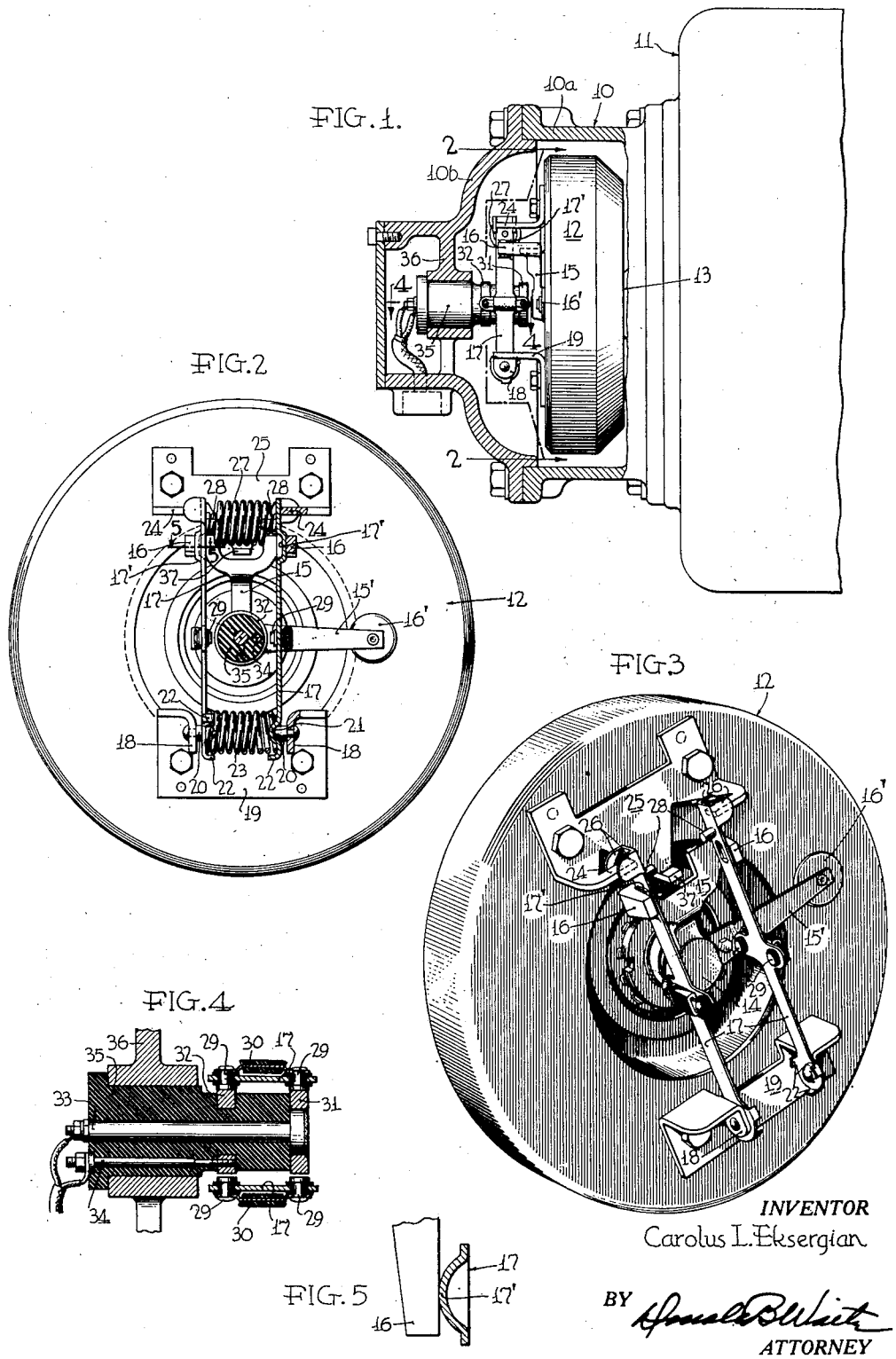

INERTIA-CONTROLLED SWITCH DEVICE

Carolus L. Eksergian, Detroit, Mich., assignor to The Budd Company, Philadelphia, Pa., a corporation of Pennsylvania Application October 1, 1946, Serial No. 700,588

5 Claims. (Cl. 200—52)

1

The invention relates to an inertia switch device and more particularly to such a device adapted to effect a control operation to prevent wheel slide due to excessive braking or, in the case of a driven wheel, to the application of excessive power as in starting a wheeled vehicle.

The invention is an improvement over the switch device shown in Patent #2,365,180 issued December 19, 1944 and entitled Brake Control Means.

It is among the objects of the invention to simplify the manufacture and assembly of such devices, thereby reducing the cost of manufacture and maintenance; to provide a device of this class which may be readily adjusted to operate at the desired differential movement between a rotatable member and a rotary inertia switch control element, and to provide a switch device which may be more sensitive to such differential movement. These and other and further objects and advantages will become apparent from the following detailed description when read in connection with the drawings forming a part of this specification.

In the drawing:

Figure 1 is an elevational view of the outer end of a railway truck journal box, showing the invention applied thereto, parts being shown in vertical section taken through the plane of the axle.

Figure 2 is an end elevational view, on an enlarged scale, taken substantially along the line 2—2 of Figure 1, parts being shown in section.

Figure 3 is a perspective view of the parts shown in Figure 2, with the springs left off to more clearly show parts hidden thereby; and Figure 4 is a detail sectional view taken substantially along the line 4—4 of Figure 1; and Figure 5 is a detail sectional view on an enlarged scale, taken on the line 5—5 of Fig. 2.

The inertia switch device of the invention is mounted, similarly to the device shown in the patent above referred to, in a casing 10 bolted to the open end of the journal box 11 in place of the usual journal box cover. Within the journal box 11 is journaled, as by usual anti-friction bearings the adjacent end of the axle of a wheel and axle assembly (not shown). The rotary inertia element 12 is mounted for rotary movement, as through an anti-friction bearing, upon a boss 13 projecting outwardly from the inner wall of the casing 10. The shaft 14 is rotatably mounted in the boss 13 concentric to the mounting of the inertia element and is connected in any suitable way (for example, as shown in the

2 patent referred to) to be driven from the axle. The outer end of this shaft has an arm 15 extending radially therefrom, this arm being bifurcated at its free end and the furcations of which have axially outwardly extending driving projections 16, 16 to provide a driving connection between the rotatable shaft 14 and the inertia element 12. The outer end of the shaft 14 may be provided with a second spring arm 15' disposed at substantially right angles to said first-named arm 15, this arm 15' carrying at its free end a brake pad 16' adapted to be pressed by the resilience of the arm against the outer flat face of the inertia element, to damp out any undesired surges of the inertia element.

The inertia element 12 is driven from the shaft 14 through a resilient drive, the elements of which are mounted on the axially outer face of the inertia element in substantially balanced relation on opposite sides of its center.

To this end, two spaced transversely extending members 17 are mounted on opposite sides of the axis of the inertia element and extend chordwise thereof. For simplicity of construction these members may be thin sheet metal strips having a certain amount of spring, and are pivotally mounted at one of their ends on spaced lugs 18, 18 on a bracket 19 secured to the face of the inertia element. Such mounting preferably comprises a stud 20 riveted to and projecting from each lug 18 and having a semi-spherical end seating in a corresponding seat 21 which may be formed by a central depression pressed into the enlarged end of the adjacent member 17. The enlarged so universally mounted ends each may be provided with at least three tabs 22, see Figure 3, which tabs form a seat for the adjacent end of a locating coil spring, as 23, which acts to press both members to their mounting seats, but does not have sufficient force to afford appreciable resistance to the desired universal movement of the members 17 on their mounting seats.

The opposite ends of the members 17 normally seat against spaced abutments 24, 24 projecting from a bracket 25 secured to the outer face of the inertia element diametrically opposite the position of the bracket 19.

To prevent appreciable axial movement of these ends of the members 17 they are provided with spaced tabs 26 loosely embracing the opposite sides of the associated abutment 24, and thus serving to guide these ends of the members in their movement in the transaxial plane in which they are mounted. These ends of the members 17 are held against their respective abutments with a predetermined force supplied by a calibrated spring, as 27, which may have its end coils reduced to fit over guide pins 28, 28 projecting from the respective members 17.

The driving projections 16, 16 on the arm 15 rotating with the shaft 14 engage, preferably through rounded pressed-out bosses 17', the opposite outside faces of the members 17, respectively, adjacent the ends thereof which are held against the abutments 24, 24 by the calibrated spring 27. Thus the rate of the spring 27 alone determines the force required to move one or the other of the members 17 away from its associated abutment 24. To provide a control signal at the desired time, all that is necessary is to accurately determine the strength of the spring 27.

When the force of the spring is overcome, as upon wheel slip, it is desirable to promptly initiate the control to correct the condition that brought about wheel slip and to this end each member 17 is provided adjacent its central portion with a pair of spaced contact buttons 29, 29 interconnected by a conductor 30 all suitably insulated from the member 17. These spaced contact buttons 29, 29 are arranged to cooperate with a pair of insulated collector rings 31 and 32 connected in a control circuit by the binding posts 33 and 34, respectively. The collector rings and binding posts are mounted in a suitable insulator plug 35 carried by the spider 36 of the casing 10 and projecting into the space between the members 17, see Figs. 1 and 2, so as to bring the collector rings into the transaxial plane of the axially spaced contact buttons 29, 29. Normally these contact buttons are spaced from the collector rings a slight distance, see Fig. 2 and bottom of Fig. 4, but at the instant one of the members 17 is moved away from its abutment 24, the contact buttons associated with it will make contact with the rings and close the control circuit. Such position is indicated at the top of Fig. 4. Simultaneous and equal contact of both buttons 28, 28 carried by a member 17 is assured by reason of the universal joint mounting of the latter and the rounded boss engagement with the adjacent driving projection 16, see Fig. 5, which readily permit any necessary tilting of the strip forming said member.

The operation of the improved inertia switch will now be described. Suppose the rotatable shaft 14 is being driven in a clockwise direction, Fig. 2, by the axle of the vehicle. Then the left-hand projection 16 drives the inertia element through engagement with the left-hand member 17 and through the spring 27. This spring is so calibrated that it does not permit the left-hand member 17 to leave its abutment 24 during normal running of the vehicle while the wheel connected to the axle is not slipping on the rail. Similarly the drive is through the right-hand member 17 and spring 27 when the rotatable shaft 14 is being driven in counter-clockwise direction, Fig. 2.

Suppose the shaft 14 is being driven in clockwise direction, Fig. 2, and the wheels connected to the associated axle begin to slip, thus rapidly decelerating the speed of the axle and shaft 14. The inertia element 12, because of its momentum, will overcome the action of the spring 27 and immediately move the free end of the right-hand member 17 to cause its contact buttons 29, 29 to engage the respective collector rings 31 and 32, as shown at the top in Figure 4, thus closing the control circuit, which may affect the release of the brakes causing the wheel slip for a time sufficient to allow the wheel and axle to accelerate back to normal speed. During the acceleration back to normal, the inertia element will lag behind the rotatable shaft 14, and thus again close the control circuit through the left-hand member 17 and its associated contact buttons 29, 29 and bridging conductor 30. Normally the control exercised by the first closing of the circuit is prolonged through this second closing, so that the second closing of the circuit is without effect.

The casing 10 is preferably divided as shown into an inner portion 10a and an outer cover portion 10b bolted thereto. This latter carries the collector rings mounting plug 35 and spider 36 and when removed affords ready access to the switch mechanism mounted on the inertia member 12. Since the switch elements 17 are held in place solely by the two springs 23 and 27, they can be readily removed and replaced with the inertia member either on the bench or with the inertia member mounted in place on the journal box. To prevent excessive overrun or lag of the inertia element 12 with respect to the rotatable shaft 14, a stop abutment 37 normally projects from the bracket 25 centrally between the furcations of the arm 15 on the shaft, this stop abutment engaging the respective furcations before the member 17 associated therewith can be overstressed so as to take a permanent set.

While the invention has been described herein in connection with a specific embodiment thereof, it will be understood that changes and modifications may be made by those skilled in the art without departing from the main features thereof, and such changes and modifications are intended to be covered in the appended claims.

What is claimed is:

1. An inertia switch device of the class comprising a rotatable member, a rotary inertia element yieldingly driven thereby so as to permit overrun or lag of said inertia element with respect to said rotatable member, and in which said yielding driving means comprises a pair of transaxially extending members mounted on opposite sides of the axis of said rotary inertia element, insulated collector rings mounted coaxially with said inertia element, but in spaced relation to, the intermediate portions of said transversely extending members, each of said members carrying bridging contacts for engagement with said collector rings and being engaged adjacent one of their ends by the rotatable member, the bridging contacts of one or the other of said transversely extending members being brought into contact with said collector rings upon predetermined overrun or lag of said inertia element with respect to said rotatable member to close a control circuit, characterized by the fact that a calibrated spring is inserted between the ends of said transversely extending members which are engaged by the rotatable member and that said spring forms the sole means for resisting movement of said ends away from associated abutments on the inertia element, against which said ends normally rest, and further characterized by the fact that the opposite ends of said members and the inertia element carry cooperating means for universally mounting said transverse members and that a single spring extends between said opposite ends of said members for maintaining said mounting means in cooperative relation.

2. An inertia switch device of the class comprising a rotatable member, a rotary inertia element yieldingly driven thereby so as to permit overrun or lag of said inertia element with respect to said rotatable member, and in which said yielding driving means comprises a pair of transversely extending members mounted on the opposite sides of the axis of said rotary inertia element, insulated collector rings mounted coaxially with said inertia element and disposed between, and normally in spaced relation to, the intermediate portions of said transversely extending members, each of said members carrying bridging contacts for engagement with said collector rings and being engaged adjacent one of their ends by the rotatable member, a spring between said ends of said transversely extending members for holding said ends against fixed abutments on the inertia element, the bridging contacts of one or the other of said transversely extending members being brought into contact with said collector rings upon predetermined overrun or lag of said inertia element with respect to said rotatable member to close a control circuit, characterized by the fact that the opposite ends of said transversely extending members and the inertia element are provided with cooperating means forming universal mountings for said members, and that a single spring means extends between said opposite ends for maintaining the respective universal mountings in cooperative relation.

3. An inertia switch device of the class comprising a rotatable member, a rotary inertia member yieldingly driven thereby so as to permit overrun or lag of said inertia element with respect to said rotatable member, and in which said yielding driving means comprises a pair of transversely extending members mounted on opposite sides of the axis of said rotary inertia element, insulated collector rings mounted coaxially with said inertia element and disposed between, but normally spaced from, the intermediate portions of said transversely extending members, each of said members carrying bridging contacts for engagement with said collector rings and being engaged adjacent one of their ends by said rotatable member, said ends being normally pressed against respective abutments on the rotary inertia element, a single coil spring extending between said ends for so pressing them against said abutments, the bridging contacts of one or the other of said transversely extending members being brought into contact with said collector rings upon predetermined overrun or lag of said inertia element with respect to said rotatable member to close a control circuit, characterized by the fact that cooperating means are associated with said abutments and the associated ends of said members for guiding said ends for movement in transaxial plane only, and that cooperating means on the opposite ends of said members and said inertia element provide universal mounts for said opposite ends.

4. An inertia switch device of the class comprising a rotatable member, a rotary inertia element yieldingly driven thereby, and in which said yielding driving means comprises a transversely extending member mounted on a transaxial face of said inertia element, insulated collector rings disposed transaxially opposite the intermediate portion of said member and in normally spaced relation thereto, said transverse member carrying bridging contacts for engagement with said collector rings and being engaged adjacent one end thereof by said rotatable member, the bridging contacts of said transversely extending member being brought into contact with said collector rings upon predetermined relative rotation from normal of said inertia element with respect to said rotatable member to close a control circuit, characterized by the fact that means are provided for removably and universally mounting the opposite end of said transversely extending member, said means comprising a parti-spherical abutment on one of said transversely extending member and said inertia element and a coacting recessed seat on the other, and that a readily removable spring means is provided for holding said abutment and seat in coacting engagement.

5. An inertia switch device of the class comprising a rotatable member, a rotary inertia element yieldingly driven thereby, and in which said yielding driving means comprises a transversely extending member mounted adjacent its ends against spaced abutments on the inertia element, said rotatable member having driving engagement with said transversely extending member, collector rings disposed opposite, but normally in slightly spaced relation to, an intermediate portion of said transversely extending member, the transversely extending member carrying bridging contacts for engagement with said collector rings upon predetermined relative rotation from normal of said inertia element with respect to said rotatable member to close a control circuit, characterized by the fact that at least one of said abutments is designed to coact with a part on the transversely extending member to allow relatively free limited rotary movement of said transversely extending member about its longitudinal axis, and that springs adjacent the ends of said transversely extending member form the sole means for holding said ends against the respective abutments.

CAROLUS L. EKSERGIAN.

REFERENCES CITED

The following references are of record in the file of this patent:

UNITED STATES PATENTS

| Number | Name | Date |
|---|---|---|
| 2,365,180 | Eksergian | Dec. 19, 1944 |
| 2,369,726 | Eksergian et al. | Feb. 20, 1945 |